(12) United States Patent
Hwang et al.

(10) Patent No.: US 10,940,572 B2
(45) Date of Patent: Mar. 9, 2021

(54) METHOD FOR DETERMINING LUBRICANT CONSUMPTION BY A TRANSMISSION MECHANISM

(71) Applicant: Hiwin Technologies Corp., Taichung (TW)

(72) Inventors: Yih-Chyun Hwang, Taichung (TW); Yi-Jun Feng, Taichung (TW); Yi Haung, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 453 days.

(21) Appl. No.: 15/916,655

(22) Filed: Mar. 9, 2018

(65) Prior Publication Data
US 2019/0275628 A1  Sep. 12, 2019

(51) Int. Cl.
| | |
|---|---|
| B23Q 11/12 | (2006.01) |
| B23Q 11/10 | (2006.01) |
| B23Q 17/00 | (2006.01) |
| F16H 57/04 | (2010.01) |
| F16N 29/02 | (2006.01) |

(52) U.S. Cl.
CPC ......... *B23Q 11/1046* (2013.01); *B23Q 11/12* (2013.01); *B23Q 17/007* (2013.01); *F16H 57/0497* (2013.01); *F16N 29/02* (2013.01); *B23Q 11/10* (2013.01); *B23Q 11/124* (2013.01); *B23Q 11/125* (2013.01); *F16H 57/049* (2013.01); *F16N 2210/12* (2013.01); *F16N 2270/20* (2013.01); *G05B 2219/49043* (2013.01)

(58) Field of Classification Search
None
See application file for complete search history.

(56) References Cited

U.S. PATENT DOCUMENTS

| | | | | |
|---|---|---|---|---|
| 5,373,755 A | * | 12/1994 | Rohlinger | F16H 25/2214 74/424.86 |
| 5,823,245 A | * | 10/1998 | Wolf | B22D 11/07 164/452 |
| 6,354,975 B1 | * | 3/2002 | Thoma | B60K 17/105 475/83 |
| 6,568,508 B2 | * | 5/2003 | West | F16H 25/2214 184/5 |
| 8,712,261 B2 | * | 4/2014 | Kudo | G03G 21/0094 399/43 |
| 9,657,820 B1 | * | 5/2017 | Hsieh | F16H 57/0464 |
| 2002/0088317 A1 | * | 7/2002 | Chen | B23B 3/06 82/118 |

(Continued)

*Primary Examiner* — Kibrom K Gebresilassie
(74) *Attorney, Agent, or Firm* — Birch, Stewart, Kolasch & Birch, LLP (57) ABSTRACT

A method for determining lubricant consumption by a transmission mechanism disposed on a machine tool includes steps of: a) estimating, based on an operational speed and a predetermined first predictive model, a total operational physical quantity; b) estimating, based on an individual operational physical quantity and the total operational physical quantity, a total operational count; c) receiving actuation information from the machine tool, and calculating a partial operational count based on the actuation information; and d) calculating, based on the partial operational count and the total operational count, a ratio between an amount of lubricant consumption within a time period and a total amount of lubricant.

6 Claims, 9 Drawing Sheets

(56) References Cited

U.S. PATENT DOCUMENTS

| | | | | |
|---|---|---|---|---|
| 2012/0321330 A1* | 12/2012 | Kudo | ................. | G03G 21/0094 |
| | | | | 399/43 |
| 2016/0298755 A1* | 10/2016 | Kotsuji | ................. | B60K 6/387 |
| 2018/0252362 A1* | 9/2018 | Guo | ...................... | G07C 3/005 |
| 2019/0275628 A1* | 9/2019 | Hwang | ............. | B23Q 11/1046 |

* cited by examiner

METHOD FOR DETERMINING LUBRICANT CONSUMPTION BY A TRANSMISSION MECHANISM

FIELD

The disclosure relates to a method for determining lubricant consumption, and more particularly to a method for determining lubricant consumption by a transmission mechanism.

BACKGROUND

Ball screws have been widely utilized in applications of machine tools where high precision of positioning and long service life are required. In general, a ball screw includes a screw nut and a screw rod. The screw nut threadedly engages the screw rod and is movable along the screw rod via rotatable balls. In addition, lubricant is provided to reduce friction between the rotatable balls and the screw rod so as to enable the screw nut to move more smoothly along the screw rod and to extend the service life of the ball screw.

Taiwanese Invention Patent No. 1525409 discloses a method for determining oil injection time of linear transmission element, i.e., time to provide the ball screw with the lubricant. In an approach disclosed in the aforementioned patent, the oil injection time is determined through a real-time analysis (i.e., analysis is performed during operation of the linear transmission element) on vibration signal detected by a vibration sensor disposed on the linear transmission element. However, the real-time analysis on the vibration signal requires a relatively large amount of computing resources and increases hardware cost of implementation.

SUMMARY

Therefore, an object of the disclosure is to provide a method for determining lubricant consumption by a transmission mechanism that can alleviate at least one of the drawbacks of the prior art.

According to the disclosure, the method is to be implemented by a sensing system which includes a computing device. The transmission mechanism is disposed on a machine tool, is provided with an amount of lubricant, and operates at an operational speed. The method includes steps of:

a) estimating, by the computing device, a total operational physical quantity based on the operational speed and a predetermined first predictive model which corresponds to the amount of lubricant and which represents a correspondence relationship between the operational speed and the total operational physical quantity, the total operational physical quantity resulting from operation of the transmission mechanism at the operational speed while consuming the amount of lubricant and being a sum of individual operational physical quantities each of which results from one occurrence of action performed by the transmission mechanism;

b) estimating, by the computing device based on the total operational physical quantity estimated in step a) and one of the individual operational physical quantities, a total operational count representing a total number of occurrences of the action that the transmission mechanism is estimated to perform during operation of the transmission mechanism at the operational speed to consume the amount of lubricant;

c) by the computing device, receiving from the machine tool, actuation information associated with actuation of the transmission mechanism to operate within a time period, and calculating based on the actuation information, a partial operational count representing a number of occurrences of the action that the transmission mechanism has performed within the time period; and d) calculating, by the computing device based on the partial operational count and the total operational count estimated in step b), a ratio between an amount of lubricant consumption within the time period and the amount of lubricant.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
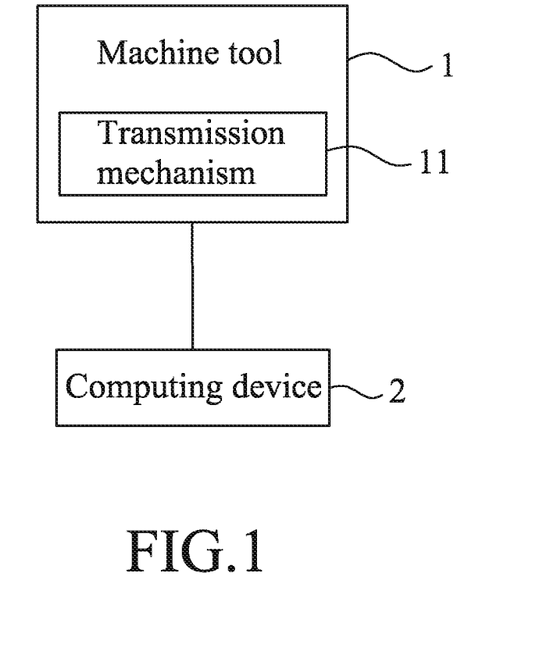
FIG. 1 is a block diagram illustrating an embodiment of a sensing system utilized to implement a method for determining lubricant consumption by a transmission mechanism according to the disclosure.

Referring to FIG. 1, an embodiment of a sensing system is illustrated. The sensing system is utilized to implement a method for determining lubricant consumption by a transmission mechanism 11. The sensing system includes a computing device 2 which is electrically connected to a machine tool 1. The transmission mechanism 11 is disposed on the machine tool 1 and is provided with a specific amount of lubricant. The transmission mechanism 11 is operating at an operational speed. In this embodiment, the transmission mechanism 11 is implemented by a ball screw and the operational speed is represented by a rotational speed of the ball screw. However, implementation of the transmission mechanism 11 is not limited thereto and may vary in other embodiments; for example, the transmission mechanism 11 may be implemented by a ball spline.

Figure 2:
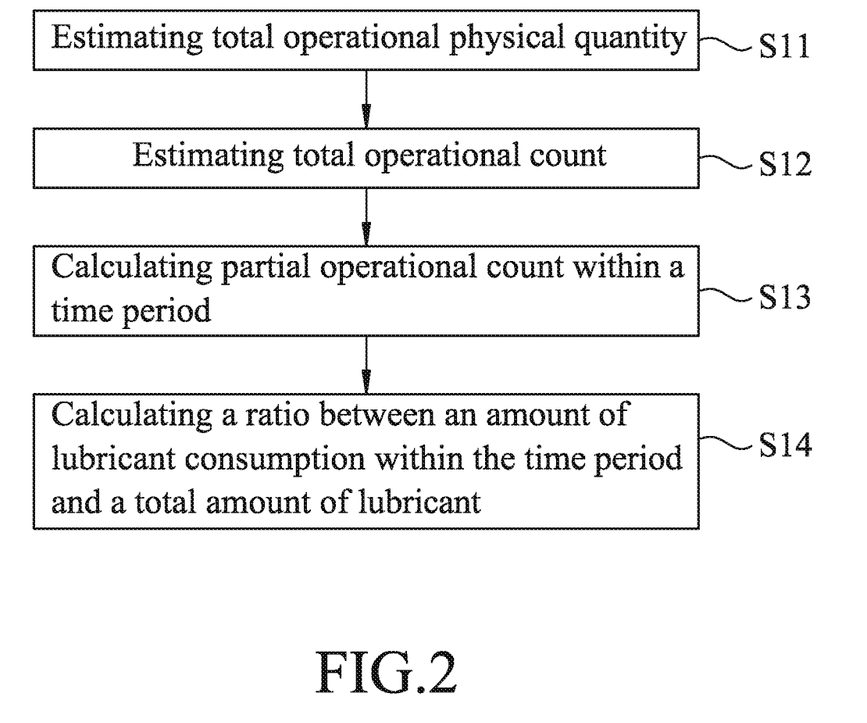
FIG. 2 is a flow chart illustrating a first embodiment of the method for determining lubricant consumption by the transmission mechanism according to the disclosure.

Referring to FIG. 2, a first embodiment of the method according to this disclosure is illustrated. The method includes steps S11 to S14 that are described in the following.

In step S11, based on the operational speed, which is determined in advance, and a predetermined first predictive model which corresponds to the specific amount of lubricant and which represents a correspondence relationship between the operational speed and a total operational physical quantity, the computing device 2 estimates the total operational physical quantity. The total operational physical quantity results from operation of the transmission mechanism 11 at the operational speed while consuming the specific amount of lubricant and is a sum of individual operational physical quantities each of which results from one occurrence of action performed by the transmission mechanism 11, where the lubricant in said specific amount is consumed by the occurrences of action, combined.

Figure 3:
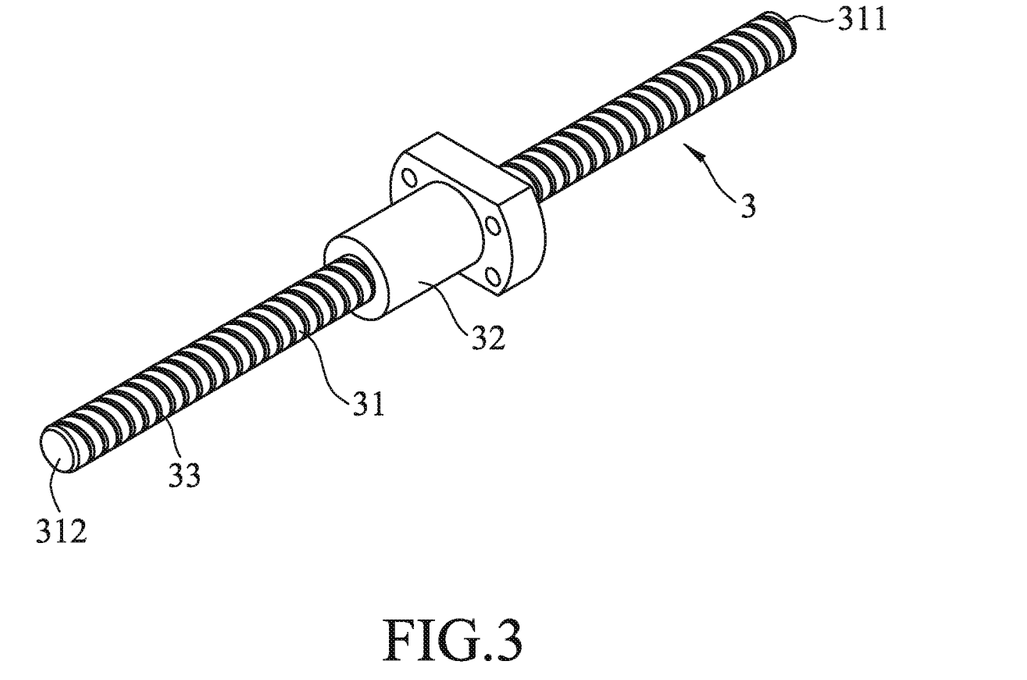
FIG. 3 is a perspective view illustrating an embodiment of a ball screw.

Specifically speaking, referring to a ball screw 3 shown in FIG. 3, the ball screw 3 serves as the transmission mechanism 11 and includes a screw rod 31 and a screw nut 32. The screw rod 31 has a first terminal 311 and a second terminal 312, and is formed with a screw groove 33 on a surface of the screw rod 31. In this case, a single individual operational physical quantity is defined as, for each movement of the screw nut 32 from one of the first and second terminals 311 and 312 to the other one of the first and second terminals 311 and 312 (i.e., one occurrence of action performed by the transmission mechanism 11 that is the ball screw 3), one of the following: a surface area of the screw groove 33 that is defined herein as a surface area of the screw groove 33 covered by passage of the screw nut 32 on the screw rod 31 during the movement; a length of the screw groove 33 that is defined herein as a length of a route traveled by the screw nut 32 along the screw groove 33 during the movement; and a translational distance that is defined herein as a straight line distance between a start and an end of the passage of the screw nut 32 on the screw rod 31 during the movement. Therefore, the total operational physical quantity is one of the following: an aggregate surface area of the screw groove 33 that is an aggregation of the surface areas of the screw groove 33 covered by passages of the screw nut on the screw rod 31 for the operation of the transmission mechanism 11 operating at the operational speed to consume the specific amount of lubricant; an aggregate length of the screw groove 33 that is an aggregation of the lengths of the routes traveled by the screw nut 32 along the screw groove 33 for the operation of the transmission mechanism 11 operating at the operational speed to consume the specific amount of lubricant, and an aggregate translational distance that is an aggregation of the straight line distances, each between the start and the end of a corresponding one of the passages of the screw nut 32 on the screw rod 31 for a corresponding movement, for the operation of the transmission mechanism 11 operating at the operational speed to consume the specific amount of lubricant.

Figure 4:
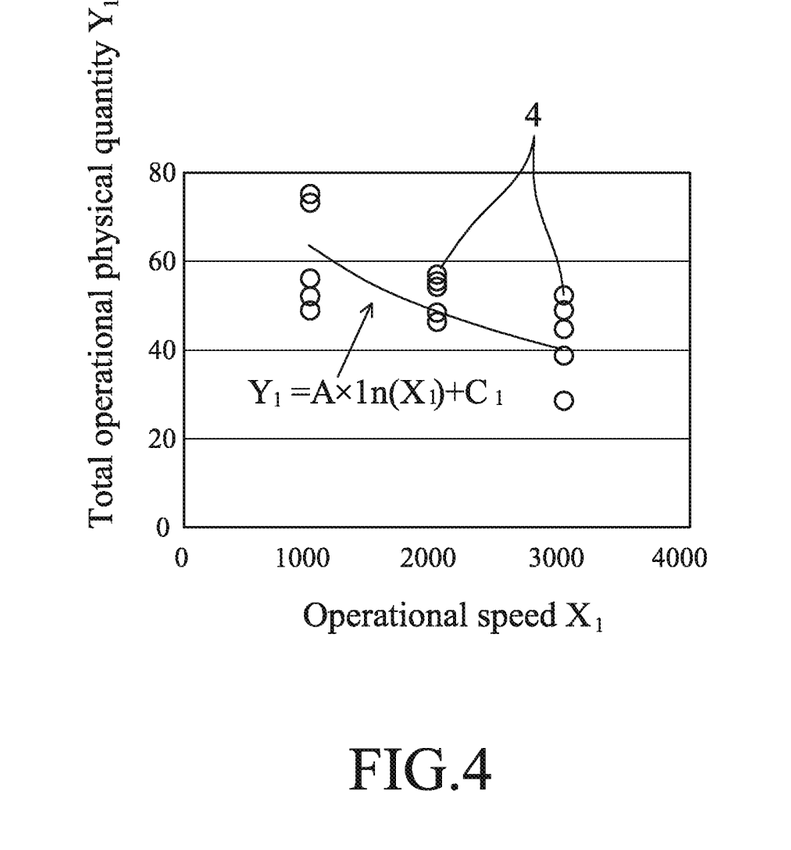
FIG. 4 is a scatter plot illustrating an embodiment of a first predetermined predictive model according to the disclosure.

The predetermined first predictive model is implemented by a linear function of a first logarithmic function to which the operational speed serves as an input. FIG. 4 exemplifies the predetermined first predictive model by a plot of an equation $Y_1 = A \times \ln(X_1) \times C_1$, where $X_1$ represents the operational speed and $Y_1$ represents the total operational physical quantity corresponding to the operational speed. Before utilizing the predetermined first predictive model, coefficients $A$ and $C_1$ are estimated in advance based on plural entries of training data 4. Each of the entries of training data 4 contains a record of an operational speed and a record of total operational physical quantity corresponding to the aforementioned record of the operational speed. It should be noted that the predetermined first predictive model is not limited to what is disclosed herein and implementation of the predetermined first predictive model may vary in other embodiments. For example, the predetermined first predictive model may be implemented by a linear regression model or a neural network model.

Additionally, there are several ways to prepare the entries of training data 4. For instance, Taiwanese Invention Patent No. 1525409 discloses a method of estimating total time length it will take a ball screw operating at a specific operational speed to consume a specific amount of lubricant, which is provided to the ball screw. Based on the total time length thus estimated, since an operational physical quantity per unit time that results from rotation or movement of the ball screw at the specific operational speed is constant and known, a total operational physical quantity corresponding to the specific operational speed can consequently be calculated. As shown in FIG. 4, the entries of training data 4 for the predetermined first predictive model are distributed over a wide range of operational speeds and correspondingly over a wide range of total operational physical quantities, so the predetermined first predictive model thus determined based on the entries of training data 4 is suitable for being utilized to estimate the total operational physical quantity corresponding to a broad range of the operational speeds.

In step S12, based on the total operational physical quantity estimated in step S11 and one of the individual operational physical quantities, the computing device 2 estimates a total operational count representing a total number of occurrences of the action that the transmission mechanism 11 would perform during operation of the transmission mechanism 11 at the operational speed to consume the specific amount of lubricant. In one embodiment, the total operational count thus estimated is implemented to be equal to the total operational physical quantity thus estimated in S11 divided by a single one of the individual operational physical quantities, where the individual operational physical quantities are presumably identical.

Figure 5:
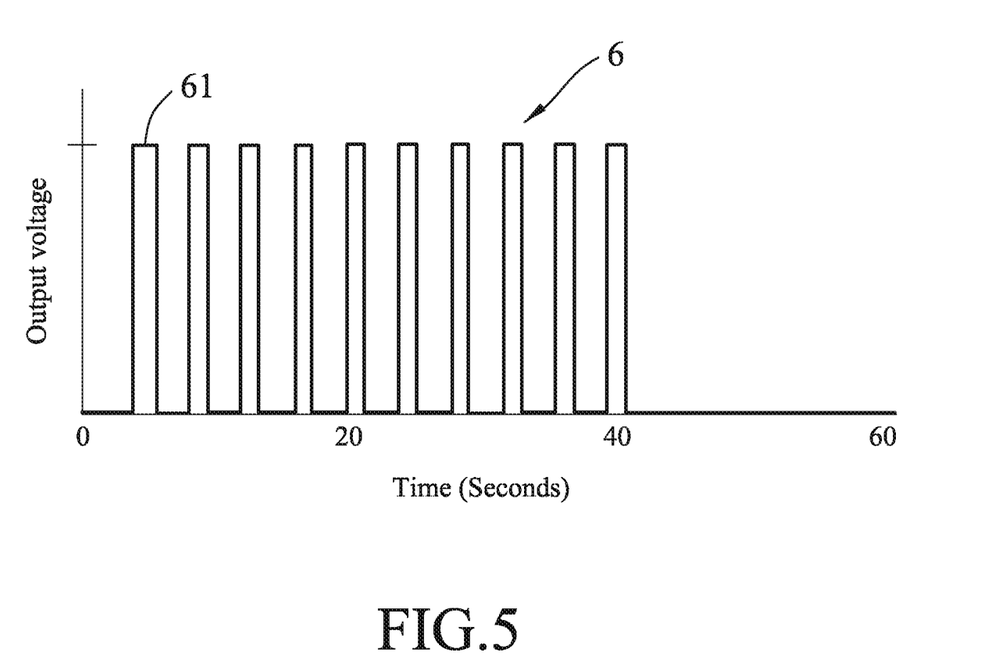
FIG. 5 is a timing diagram illustrating an embodiment of a voltage signal outputted by a machine tool.

In step S13, the computing device 2 receives actuation information from the machine tool 1. The actuation information is associated with actuation of the transmission mechanism 11 to operate within a time period. Then, the computing device 2 calculates, based on the actuation information, a partial operational count representing a number of occurrences of the action that the transmission mechanism 11 has performed within the time period. In one embodiment, a first output voltage 6 of the machine tool 1 within sixty seconds (i.e., the time period) that is utilized to actuate the transmission mechanism 11 to operate serves as the actuation information (see FIG. 5). For example, the first output voltage 6 may be supplied to a motor that is coupled with the ball screw 3 and that is controlled by the first output voltage 6 to drive rotation of the ball screw 3. To actuate the transmission mechanism 11, a value of the first output voltage 6 is set to be greater than zero; to stop the transmission mechanism 11, the value of the first output voltage 6 is set to be equal to zero. The computing device 2 receives the first output voltage 6 from the machine tool 1 and counts a number of voltage peaks 61 of the first output voltage 6 so as to determine the partial operational count. Specifically speaking, the partial operational count, which represents the number of occurrences of the action that the transmission mechanism 11 has performed within sixty seconds, is equal to the number of voltage peaks 61 of the first output voltage 6, e.g., ten in the example shown in FIG. 5.

In step S14, based on the partial operational count calculated in step S13 and the total operational count estimated in step S12, the computing device 2 calculates a ratio between an amount of lubricant consumption within the time period and the total amount of lubricant (i.e., the specific amount of lubricant). In this embodiment, the ratio between the amount of lubricant consumption within the time period and the total amount of lubricant is equal to the partial operational count expressed as a percentage of the total operational count.

Figure 6:
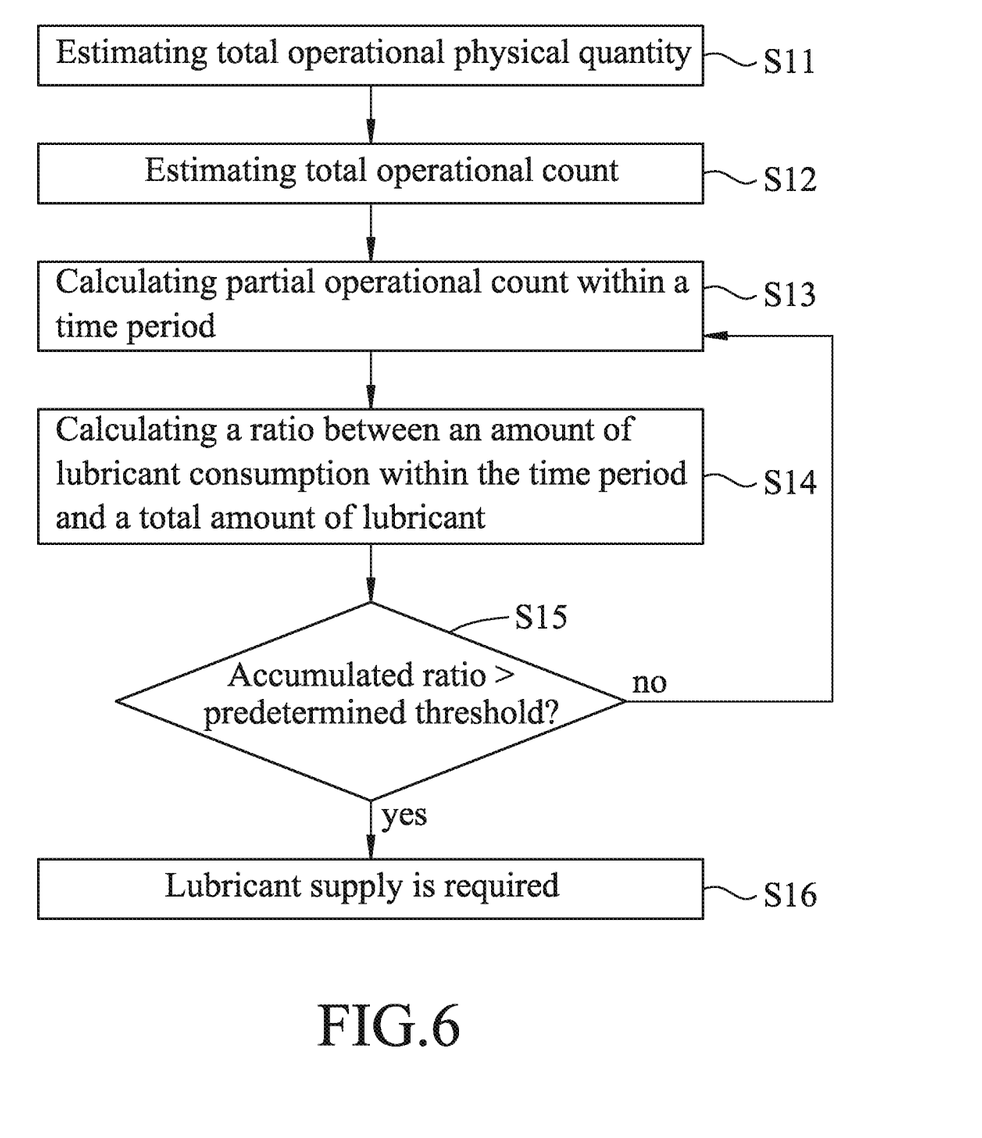
FIG. 6 is a flow chart illustrating an embodiment of determining when lubricant supply is needed for the transmission mechanism by utilizing the first embodiment of the method according to the disclosure.

It is worth noting that a variation of the first embodiment of the method as shown in FIG. 6 can be further utilized to determine whether lubricant supply to the transmission mechanism 11 is needed. Referring to FIG. 6, in this embodiment, the computing device 2 receives the actuation information from the machine tool 1 regularly, e.g., every 60 seconds (the time period is 60 seconds long). Every time, upon receipt of the actuation information, the computing device 2 calculates, in step 13, the partial operational count based on the actuation information, and calculates, in step S14, the ratio between the amount of lubricant consumption within the time period and the total (or specific) amount of lubricant. In step S15, the computing device 2 calculates an accumulation of the ratios calculated in a current and any previous occurrences of step S14 so as to result in an accumulated ratio between an accumulated amount of lubricant consumption within a sum of the time period (s) that has/have passed thus far and the total amount of lubricant. Moreover, the computing device 2 determines whether the accumulated ratio is greater than a predetermined threshold. In this embodiment, the predetermined threshold is implemented to be one hundred percent. However, implementation of the predetermined threshold is not limited to this and may vary in other embodiments. When it is determined that the accumulated ratio is greater than the predetermined threshold, the computing device 2 determines in step S16 that the transmission mechanism 11 needs to be provided with lubricant. Otherwise, when it is determined that the accumulated ratio is not greater than the predetermined threshold, a flow of procedure of the method goes back to step S13 for calculation with respect to a next incoming actuation information.

It is worth to note that although the entries of training data 4 have to be prepared in advance in order to train the predetermined first predictive model before the method disclosed in the first embodiment is performed "online" (goes live or is up and running) to determine lubricant consumption by a transmission mechanism, the predetermined first predictive model merely has to be trained once "offline". In other words, during operation of the machine tool 1 and the transmission mechanism 11, the predetermined first predictive model that has been trained is directly used to implement the method of this disclosure. Therefore, an amount of computation required to perform the first embodiment of the method is moderate. Compared with the method disclosed in Taiwanese Invention Patent No. 1525409, the first embodiment of the method of this disclosure, when being performed online, does not require a vibration detector which detects vibration of the transmission mechanism and generates a vibration signal, and thus implementation of the first embodiment of the method of this disclosure is relatively low in terms of hardware cost and has a relatively low computational resource requirement.

Next, a second embodiment of the method for determining lubricant consumption by a transmission mechanism according to this disclosure will be described. The second embodiment of the method is similar to the first embodiment of the method, but is different from the first embodiment in that besides considering the operational speed of the transmission mechanism 11, the computing device 2 further takes into account influence of temperature of the transmission mechanism 11 in operation when estimating the total operational physical quantity and estimating the total operational count. In general, the higher the temperature of the transmission mechanism 11 in operation, the faster the consumption of lubricant, and the smaller the total operational physical quantity.

Figure 7:
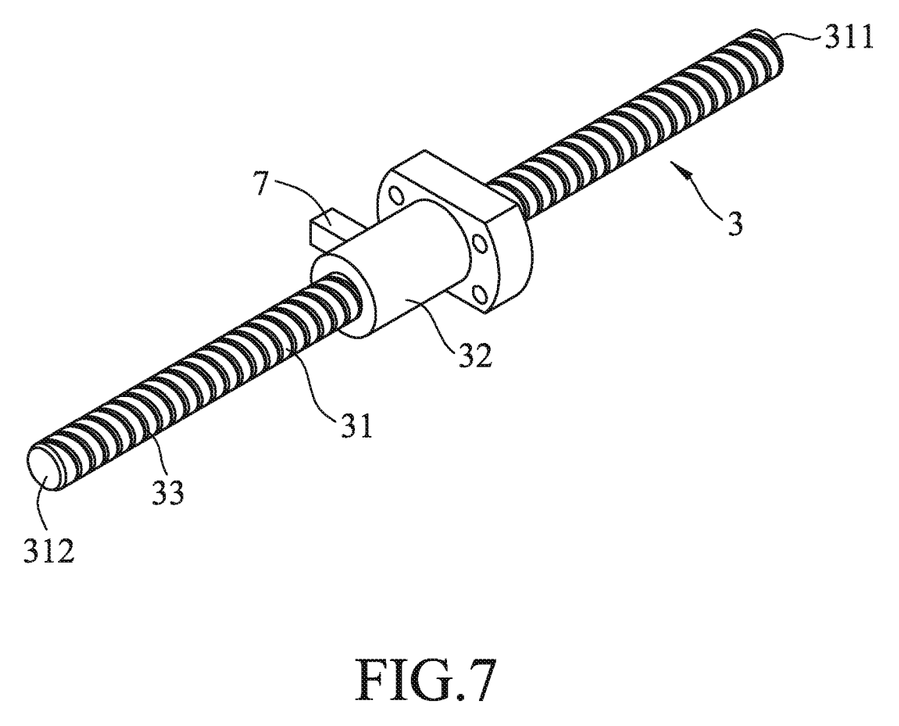
FIG. 7 is a perspective view illustrating an embodiment of a temperature sensor disposed on a screw nut of the ball screw.

Specifically speaking, in the second embodiment of the method, the sensing system further includes a temperature sensor 7 (see FIG. 7) disposed on the transmission mechanism 11 (see FIG. 1). For the ball screw 3 shown in FIG. 7, the temperature sensor 7 is disposed on the screw nut 32 of the ball screw 3.

Figure 8:
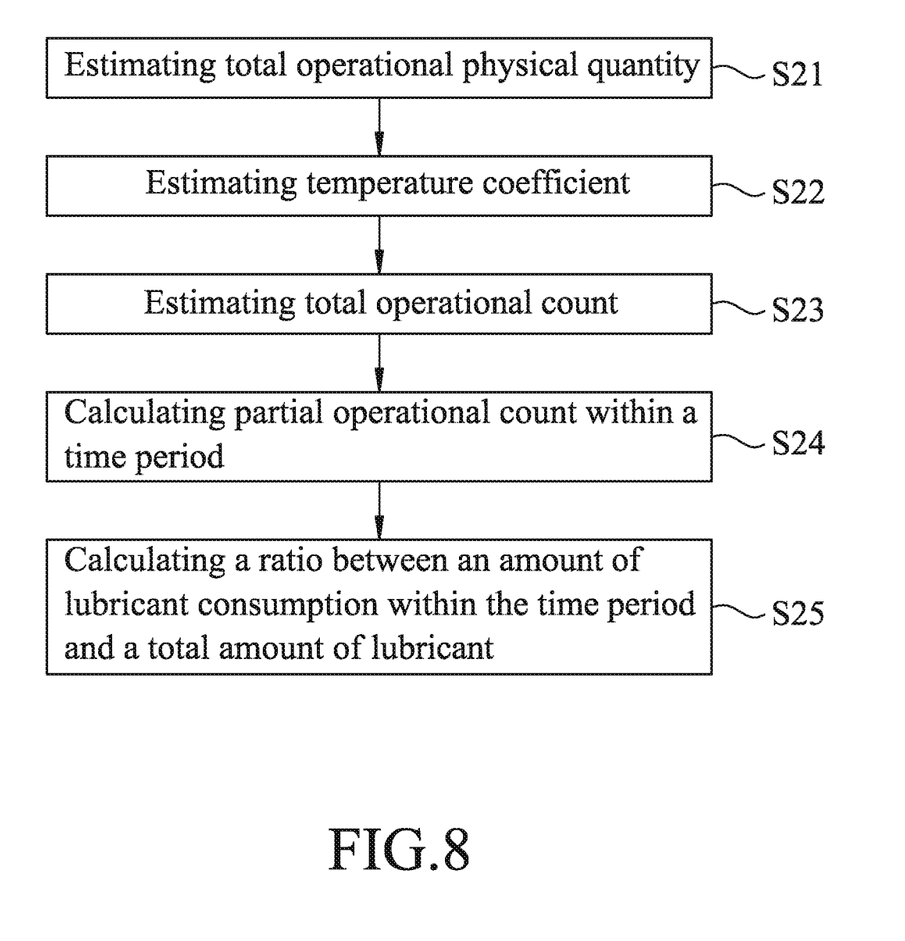
FIG. 8 is a flow chart illustrating a second embodiment of the method for determining lubricant consumption by the transmission mechanism according to the disclosure.
Figure 9:
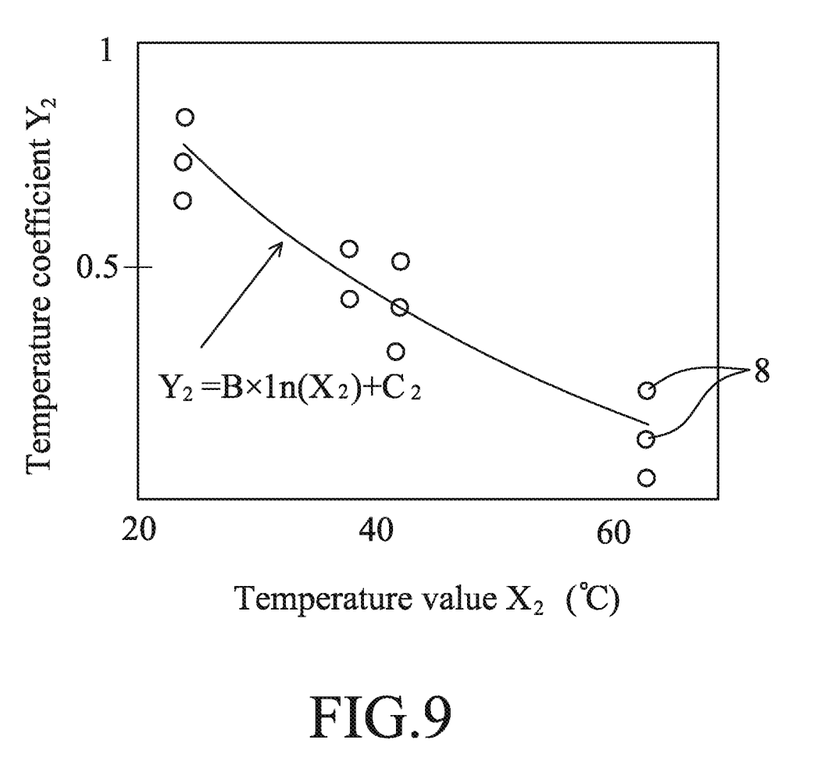
FIG. 9 is a scatter plot illustrating an embodiment of a second predetermined predictive model according to the disclosure.

Referring to FIGS. 8 and 9, the second embodiment of the method is illustrated.

Similar to step S11, in step S21, the computing device 2 estimates the total operational physical quantity corresponding to the operational speed of the transmission mechanism 11 based on the operational speed and the predetermined first predictive model.

In step S22, the computing device 2 receives, from the temperature sensor 7 during operation of the transmission mechanism 11, a temperature value which is a result of measurement of temperature of the transmission mechanism 11.

In addition, the computing device 2 estimates a temperature coefficient based on the temperature value and a predetermined second predictive model which corresponds to the specific amount of lubricant and which represents a correspondence relationship between the temperature coefficient and the temperature value. The temperature coefficient is a ratio between the total operational physical quantity resulting from operation of the transmission mechanism 11 at a given operational speed under a temperature condition of the temperature value and the total operational physical quantity resulting from operation of the transmission mechanism 11 at the same given operational speed under the temperature condition of a reference value that is lower than the temperature value. For example, for the transmission mechanism 11 rotating at 3000 RPM, given that the reference value is 20° C., the temperature value is 30° C., and the total operational physical quantities resulting from operation of the transmission mechanism 11 under the temperature conditions of the temperature value (i.e., 30° C.) and the reference value (i.e., 20° C.) are respectively N and M, the temperature coefficient corresponding to 30° C. is calculated as $$\frac{N}{M}.$$

Referring to FIG. 9, in this embodiment, the predetermined second predictive model is implemented by a linear function of a second logarithmic function to which the temperature value serves as an input. Specifically speaking, the predetermined second predictive model can be mathematically expressed by an equation $Y_2 = B \times \ln(X_2) + C_2$, where $X_2$ represents the temperature value thus measured and $Y_2$ represents the temperature coefficient corresponding to the temperature value.

Before utilizing the predetermined second predictive model, coefficients B and $C_2$ are estimated in advance based on plural other entries of training data 8. Each of said other entries of training data 8 contains a record of the temperature value and a record of the temperature coefficient corresponding to the record of the temperature value. It should be noted that depending on different operational speeds, said other entries of training data 8 may vary and a distinct second predictive model may be created. Furthermore, the predetermined second predictive model is not limited to what is disclosed herein and implementation of the predetermined second predictive model may vary in other embodiments. For example, the predetermined second predictive model may be implemented by a linear regression model or a neural network model.

Additionally, there are several ways to prepare said other entries of training data 8. For instance, Taiwanese Invention Patent No. 1525409 discloses the method of estimating the total time length it will take the ball screw operating at the specific operational speed to consume the specific amount of lubricant which is provided to the ball screw. By combining the method of estimating the total time length and the measurement of temperature of the ball screw, the total operational physical quantity corresponding to the specific operational speed for each of different temperature values can consequently be calculated, and so can a corresponding one of the temperature coefficients.

In step S23, the computing device 2 estimates the total operational count based on the total operational physical quantity estimated in step S21, the temperature coefficient estimated in step S22, and one of the individual operational physical quantities. The total operational count is positively correlated to the temperature coefficient thus estimated. Specifically speaking, the total operational count is equal to the total operational physical quantity, which is estimated in step S21, multiplied by the temperature coefficient, and divided by one of the individual operational physical quantities, where the individual operational physical quantities are presumably identical.

Subsequently, since steps S24 and S25 are respectively similar to steps S13 and S14 of the first embodiment of the method, details of steps S24 and S25 will be omitted herein for the sake of brevity.

Likewise, similar to the first embodiment of the method, a variation of the second embodiment of the method can be utilized to determine whether lubricant supply for the transmission mechanism 11 is needed. In one embodiment, the computing device 2 regularly receives the actuation information from the machine tool 1, and, each time the actuation information is received, calculates the partial operational count based on the actuation information and further calculates the ratio between the amount of lubricant consumption within the time period corresponding to the actuation information and the total (specific) amount of lubricant. The computing device 2 computes an accumulation of the ratios currently and previously computed so as to result in the accumulated ratio between the accumulated amount of lubricant consumption within a sum of the time period (s) that has/have passed and the total amount of lubricant. The computing device 2 determines whether the accumulated ratio is greater than the predetermined threshold. The computing device 2 determines that lubricant supply to the transmission mechanism 11 is needed when it is determined that the accumulated ratio is greater than the predetermined threshold.

It is worth to note that while implementation of the second embodiment of the method requires an additional hardware cost (i.e., the temperature sensor 7) as compared with implementation of the first embodiment of the method, a result of estimation by utilizing the second embodiment of the method would be more precise than by utilizing the first embodiment of the method, because the influence of the temperature on operation of the transmission mechanism 11 is considered. Also, the hardware cost of the temperature sensor 7 is lower than that of the vibration detector, which is required by implementation of the method disclosed in Taiwanese Invention Patent No. 1525409. Further, the amount of computation performed by the second embodiment of the method is lower than the method disclosed in Taiwanese Invention Patent No. 1525409.

In summary, the method of this disclosure utilizes the computing device 2 to estimate the total operational physical quantity based on the predetermined first predictive model, to, as the case may be, estimate the temperature coefficient corresponding to the temperature value based on the predetermined second predictive model, and to estimate the total operational count based on the total operational physical quantity thus estimated, the temperature coefficient thus estimated, optionally, and the individual operational physical quantity corresponding to one occurrence of action of the transmission mechanism 11. Further, the method of this disclosure utilizes the computing device 2 to calculate the partial operational count based on the actuation information, and to calculate the ratio between an amount of lubricant consumption within the time period corresponding to the actuation information and the total, specific amount of lubricant based on the partial operational count and the total operational count.

In an embodiment, the disclosure relates to a method for determining lubricant consumption by a transmission mechanism, to be implemented by a sensing system which includes a computing device, the transmission mechanism being disposed on a machine tool, being provided with an amount of lubricant, and operating at an operational speed, the method comprising steps of:

a) estimating, by the computing device, a total operational physical quantity based on the operational speed and a predetermined first predictive model which corresponds to the amount of lubricant and which represents a correspondence relationship between the operational speed and the total operational physical quantity, the total operational physical quantity resulting from operation of the transmission mechanism at the operational speed while consuming the amount of lubricant and being a sum of individual operational physical quantities each of which results from one occurrence of action performed by the transmission mechanism;

b) estimating, by the computing device based on the total operational physical quantity estimated in step a) and one of the individual operational physical quantities, a total operational count representing a total number of occurrences of the action that the transmission mechanism is estimated to perform during operation of the transmission mechanism at the operational speed to consume the amount of lubricant;

c) by the computing device, receiving from the machine tool, actuation information associated with actuation of the transmission mechanism to operate within a time period, and calculating based on the actuation information, a partial operational count representing a number of occurrences of the action that the transmission mechanism has performed within the time period; and d) calculating, by the computing device based on the partial operational count and the total operational count estimated in step b), a ratio between an amount of lubricant consumption within the time period and the amount of lubricant.

In a further embodiment, the disclosure relates to at least one of the preceding embodiments, the sensing system further including a temperature sensor disposed on the transmission mechanism, wherein step b) further includes sub-steps of:

b-1) receiving, by the computing device, from the temperature sensor during operation of the transmission mechanism, a temperature value which is a result of measurement of temperature of the transmission mechanism;

b-2) estimating, by the computing device, a temperature coefficient based on the temperature value and a predetermined second predictive model which corresponds to the amount of lubricant and which represents a correspondence relationship between the temperature coefficient and the temperature value; and b-3) estimating, by the computing device based on the total operational physical quantity estimated in step a), the temperature coefficient estimated in sub-step b-2) and one of the individual operational physical quantities, the total operational count which is positively correlated to the temperature coefficient thus estimated.

In a further embodiment, the disclosure relates to at least one of the preceding embodiments, wherein in step b), the temperature coefficient is a ratio between the total operational physical quantity resulting from operation of the transmission mechanism under a temperature condition of the temperature value and the total operational physical quantity resulting from operation of the transmission mechanism under the temperature condition of a reference value that is lower than the temperature value.

In a further embodiment, the disclosure relates to at least one of the preceding embodiments, wherein:

in step a), the predetermined first predictive model is implemented by a linear function of a first logarithmic function to which the operational speed serves as an input; and in step b), the predetermined second predictive model is implemented by a linear function of a second logarithmic function to which the temperature value serves as an input.

In a further embodiment, the disclosure relates to at least one of the preceding embodiments, wherein in step a), the predetermined first predictive model is implemented by a linear function of a first logarithmic function to which the operational speed serves as an input.

In a further embodiment, the disclosure relates to at least one of the preceding embodiments, the transmission mechanism including a ball screw which includes a screw rod and a screw nut, the screw rod formed with a screw groove on a surface of the screw rod, the operational speed being a rotational speed of the ball screw, wherein:

in step a), the total operational physical quantity is one of an aggregate surface area of the screw groove that is an aggregation of surface areas of the screw groove covered by passages of the screw nut on the screw rod for the operation of the transmission mechanism operating at the operational speed to consume the amount of lubricant, an aggregate length of the screw groove that is an aggregation of lengths of routes traveled by the screw nut along the screw groove for the operation of the transmission mechanism operating at the operational speed to consume the amount of lubricant, and an aggregate translational distance that is an aggregation of straight line distances, each between a start and an end of a corresponding one of the passages of the screw nut on the screw rod for a corresponding one of the occurrences of action, for the operation of the transmission mechanism operating at the operational speed to consume the amount of lubricant.

In a further embodiment, the disclosure relates to at least one of the preceding embodiments, wherein:

step c) includes, by the computing device, regularly receiving the actuation information from the machine tool, and calculating the partial operational count based on the actuation information each time the actuation information is received; and step d) includes, each time the actuation information is received, calculating, by the computing device, the ratio between the amount of lubricant consumption within the time period corresponding to the actuation information currently received and the amount of lubricant;

the method further comprising steps of:

e) calculating, by the computing device, an accumulation of the ratios corresponding to the currently received actuation information and any previously received actuation information so as to result in an accumulated ratio between an accumulated amount of lubricant consumption within a sum of the time periods corresponding to the currently received actuation information and any previously received actuation information and the amount of lubricant, and f) determining, by the computing device when it is determined that the accumulated ratio is greater than a predetermined threshold, that lubricant supply to the transmission mechanism is needed.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for determining lubricant consumption by a transmission mechanism, to be implemented by a sensing system which includes a computing device, the transmission mechanism being disposed on a machine tool, being provided with an amount of lubricant, and operating at an operational speed, the transmission mechanism including a ball screw which includes a screw rod and a screw nut, the screw rod formed with a screw groove on a surface of the screw rod, the operational speed being a rotational speed of the ball screw, the method comprising steps of:

a) estimating, by the computing device, a total operational physical quantity based on the operational speed and a predetermined first predictive model which corresponds to the amount of lubricant and which represents a correspondence relationship between the operational speed and the total operational physical quantity, the total operational physical quantity resulting from operation of the transmission mechanism at the operational speed while consuming the amount of lubricant and being a sum of individual operational physical quantities each of which results from one occurrence of action performed by the transmission mechanism;

b) estimating, by the computing device based on the total operational physical quantity estimated in step a) and one of the individual operational physical quantities, a total operational count representing a total number of occurrences of the action that the transmission mechanism is estimated to perform during operation of the transmission mechanism at the operational speed to consume the amount of lubricant;

c) by the computing device, receiving from the machine tool, actuation information associated with actuation of the transmission mechanism to operate within a time period, and calculating based on the actuation information, a partial operational count representing a number of occurrences of the action that the transmission mechanism has performed within the time period; and d) calculating, by the computing device based on the partial operational count and the total operational count estimated in step b), a ratio between an amount of lubricant consumption within the time period and the amount of lubricant, wherein in step a), the total operation physical quantity is one of an aggregate surface area of the screw groove that is an aggregation of surface areas of the screw groove covered by passages of the screw nut on the screw rod for the operation of the transmission mechanism operating at the operation speed to consume the amount of lubricant, an aggregate length of the screw groove that is an aggregation of lengths of routes traveled by the screw nut along the screw groove for the operation of the transmission mechanism operating at the operation speed to consume the amount of lubricant, and an aggregate translational distance that is an aggregation of straight line distances, each between a start and an end of a corresponding one of the passages of the screw nut on the screw rod for a corresponding one of the occurrences of action, for the operation of the transmission mechanism operating at the operation speed to consume the amount of lubricant, wherein the total operational count thus estimated is equal to the total operational physical quantity thus estimated divided by a single one of the individual operational physical quantities.

2. The method as claimed in claim 1, the sensing system further including a temperature sensor disposed on the transmission mechanism, wherein step b) further includes sub-steps of:

b-1) receiving, by the computing device, from the temperature sensor during operation of the transmission mechanism, a temperature value which is a result of measurement of temperature of the transmission mechanism;

b-2) estimating, by the computing device, a temperature coefficient based on the temperature value and a predetermined second predictive model which corresponds to the amount of lubricant and which represents a correspondence relationship between the temperature coefficient and the temperature value; and b-3) estimating, by the computing device based on the total operational physical quantity estimated in step a), the temperature coefficient estimated in sub-step b-2) and one of the individual operational physical quantities, the total operational count which is positively correlated to the temperature coefficient thus estimated.

3. The method as claimed in claim 2, wherein in step b-2), estimating a temperature coefficient includes:

estimating the temperature coefficient which is a ratio between the total operational physical quantity resulting from operation of the transmission mechanism under a temperature condition of the temperature value and the total operational physical quantity resulting from operation of the transmission mechanism under the temperature condition of a reference value that is lower than the temperature value.

4. The method as claimed in claim 2, wherein:

in step a), the predetermined first predictive model is implemented by a linear function of a first logarithmic function to which the operational speed serves as an input; and in step b), the predetermined second predictive model is implemented by a linear function of a second logarithmic function to which the temperature value serves as an input.

5. The method as claimed in claim 1, wherein in step a), the predetermined first predictive model is implemented by a linear function of a first logarithmic function to which the operational speed serves as an input.

6. The method as claimed in claim 1, wherein:

step c) includes, by the computing device, regularly receiving the actuation information from the machine tool, and calculating the partial operational count based on the actuation information each time the actuation information is received; and step d) includes, each time the actuation information is received, calculating, by the computing device, the ratio between the amount of lubricant consumption within the time period corresponding to the actuation information currently received and the amount of lubricant;

the method further comprising steps of:

e) calculating, by the computing device, an accumulation of the ratios corresponding to the currently received actuation information and any previously received actuation information so as to result in an accumulated ratio between an accumulated amount of lubricant consumption within a sum of the time periods corresponding to the currently received actuation information and any previously received actuation information and the amount of lubricant, and f) determining, by the computing device when it is determined that the accumulated ratio is greater than a predetermined threshold, that lubricant supply to the transmission mechanism is needed.

* * * * *